Sept. 29, 1953 F. KOCH 2,653,660
PORTABLE SCRAP CHOPPER
Filed Feb. 9, 1951 2 Sheets-Sheet 1
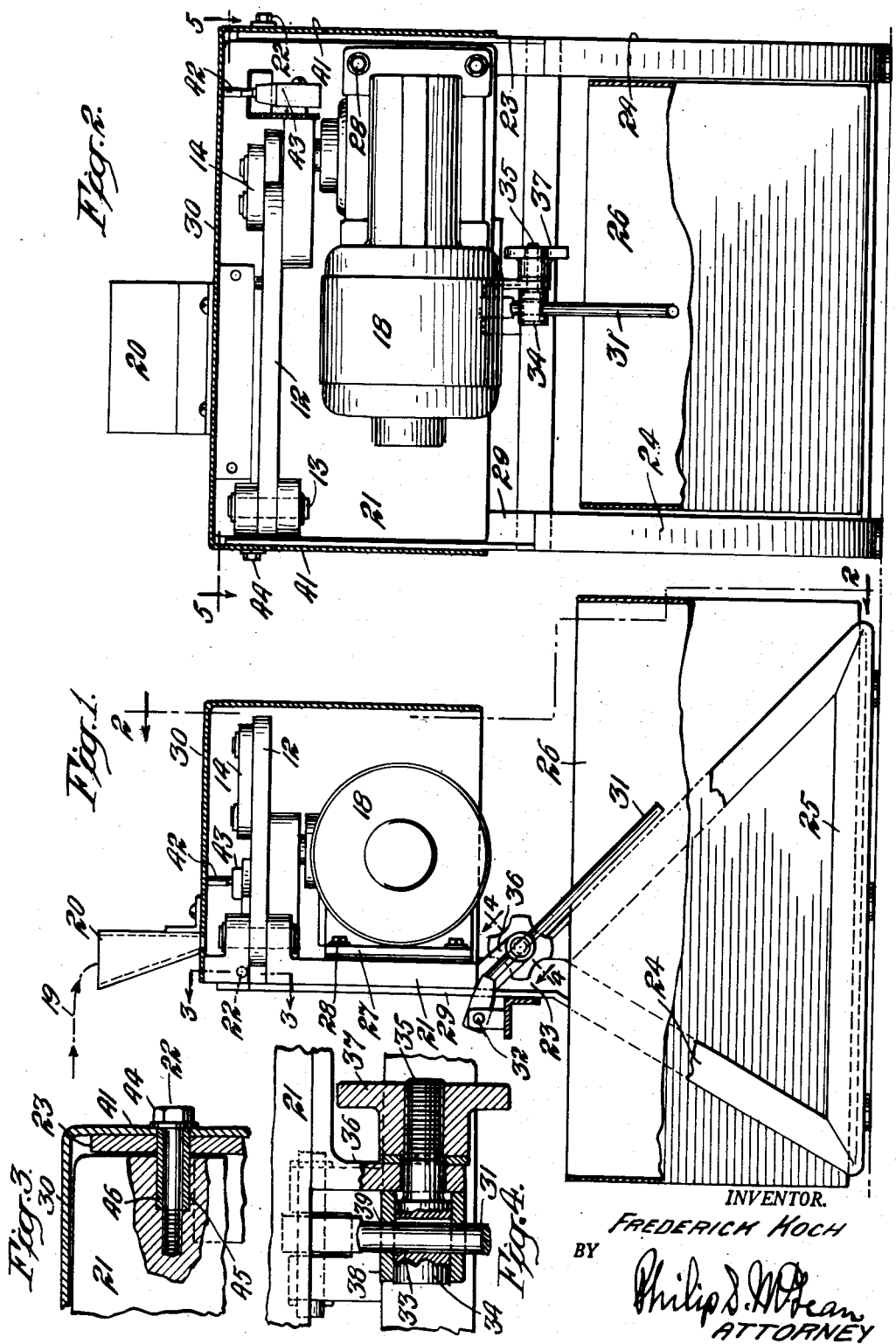
INVENTOR.
FREDERICK KOCH
BY
*Philip D. McLean*
ATTORNEY

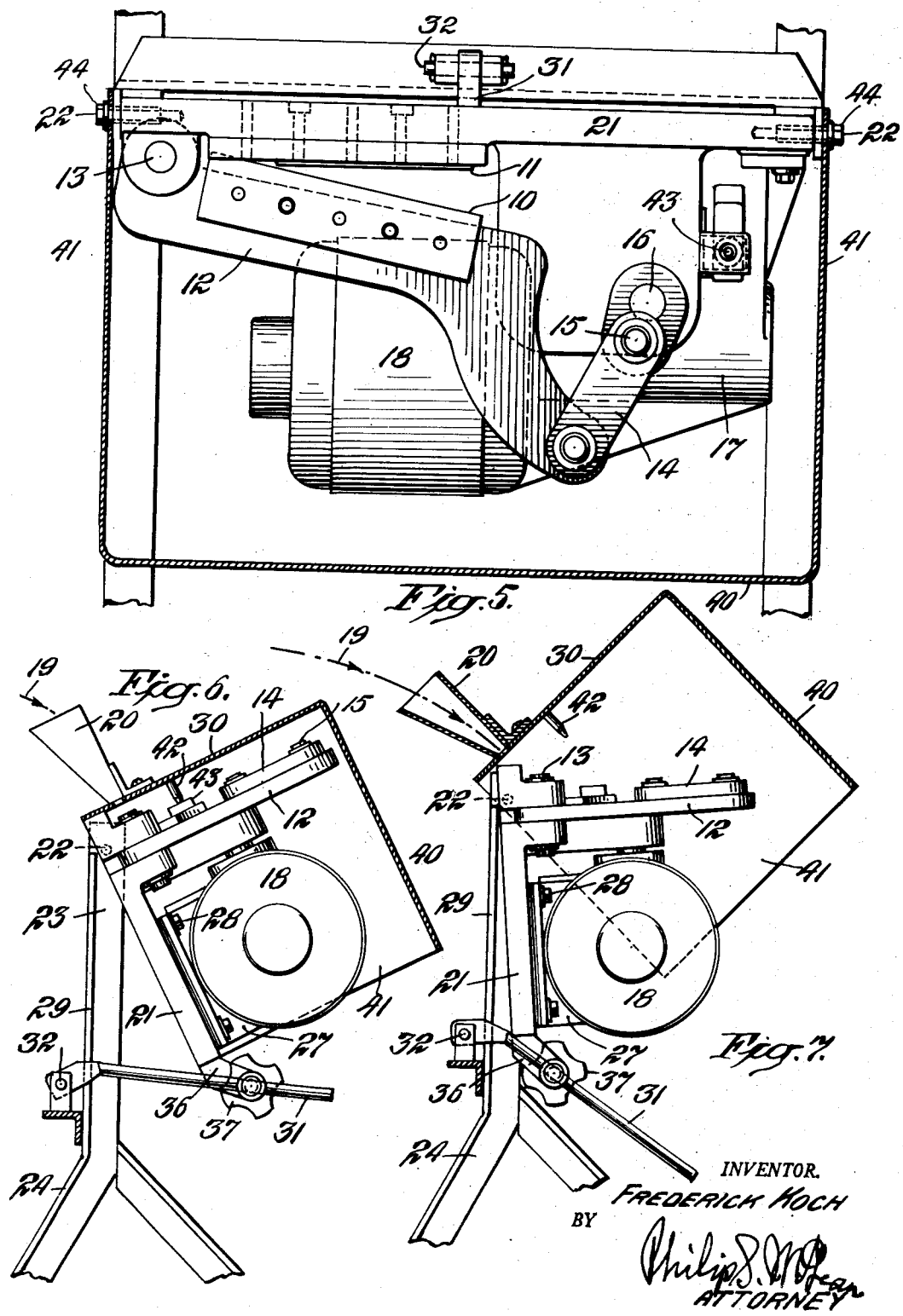

Patented Sept. 29, 1953

2,653,660

UNITED STATES PATENT OFFICE 2,653,660

PORTABLE SCRAP CHOPPER

Frederick Koch, Sparta, N. J., assignor to
C. Todd, Rutherford, N. J., as trustee Application February 9, 1951, Serial No. 210,168

1 Claim. (Cl. 164—10.6)

The invention herein disclosed relates to apparatus for disposition of the scrap issuing from punch presses and other machines operating on strip stock.

Objects of the invention are to provide a portable device in the form of a complete, self-contained unit adapted to be positioned and adjusted to receive the skeleton stock produced by such a machine and to automatically collect and reduce it to disposable form.

Further special objects of the invention are to provide such apparatus in a simple, practical construction of reasonable cost.

Other desirable objects and the novel features through which the purposes of the invention are attained are set forth or will appear in the course of the following specification.

The drawings accompanying and forming part of the specification illustrate a present practical commercial embodiment of the invention. Structure, however, may be modified and changed as regards the present illustration, all within the true intent and broad scope of the invention as hereinafter defined and claimed.

Fig. 1 in the drawings is a broken and part sectional side elevation of one of the new scrap choppers, the broken lines at the top indicating the passage of the skeleton stock from the machine where it is produced, into the chopper;

Fig. 2 is a broken vertical sectional view of the chopper as on substantially the plane of line 2—2 of Fig. 1;

Fig. 3 is an enlarged broken sectional detail of the hinge mounting of the chopper mechanism and the safety cover, on substantially the plane of line 3—3 of Fig. 1;

Fig. 4 is an enlarged broken sectional detail of the clamp for securing the chopper in different angular relations, as taken on substantially the plane of line 4—4 of Fig. 1;

Fig. 5 is a broken sectional and top plan view of parts as appearing on substantially the plane of line 5—5 of Fig. 2;

Fig. 6 is a broken and vertical sectional view showing the chopper adjusted to a different angular relation from that shown in Fig. 1;

Fig. 7 is a generally similar view but showing the safety cover lifted to interrupt operation of the machine.

Essentially the machine comprises a shearing blade 10 cooperating with a stationary blade 11 and carried by a lever 12 pivoted on a center 13 and actuated by a link 14 connected with a crank 15, Fig. 5, on a shaft 16 driven through reduction gearing in casing 17 from an electric motor 18.

The skeleton stock produced by the blanking or punching machine is represented at 19, directed by a chute or funnel 20 into the power shears described.

The shear mechanism in the illustration is all carried by a base plate 21 of substantial construction, and this base plate, for purposes of varying the angularity of the skeleton stock into the cutter, is shown as pivotally supported at 22 on the upright angle iron standards 23 of a frame 24 having a wide base 25 for selective positioning on a floor or other support adjoining the machine producing the scrap.

A pan 26 for receiving the cut scrap is shown removably positioned in this frame beneath the shear mechanism.

The motor 18 is shown carried by a bracket 27 bolted at 28 on the face of the base so as to serve as a weight holding the pivotally suspended base solidly against thhe flanges 29 of the upright frame members 23.

The stock chute 20 is shown as mounted on the top of a cover 30 normally movable with the base so as to be adjustable therewith when the base is shifted on the pivots 22.

This enables the guide chute and shear mechanism to be adjusted simultaneously to suit the normal curvature of the skeleton stock coming from the machine.

With thin or more flexible stock the change of direction may be quite abrupt, as indicated in Fig. 1, but with heavier stock the bend may be less abrupt, as indicated in Fig. 6.

To secure the cutting mechanism at a desirable angle, there is provided in the machine illustrated, a rod 31 pivoted on the frame at 32 beneath the pivoted base and extending through an opening 33 in a clamp stud 34, Fig. 4, having a screw extension 35 projecting through a lug extension 36 of the base and engaged by a clamp screw 37.

Fig. 4 shows the stud 34 as surrounded by a sleeve 38 holed at 39 for passage of the base supporting rod 31 and bearing against the opposite side of the lug 36 engaged by the clamp nut 37, and from which it will be clear that upon loosening this nut the base may be swung outward or inward as in Figs. 6 and 7, to adjust angularity or inclination of the cutter to the stock and then be secured in any position of selected angularity by tightening the clamp screw.

The top cover 30 is shown as having dependent, connected, front and end walls 40, 41, cooperating with the base to completely enclose the motor and cutter mechanism and assuring the cut stock dropping directly down into the receiver or collecting pan 26.

As a safety precaution the cutter is prevented from operation until the cover is completely lowered into protective position.

This is accomplished by pivotally supporting the cover and by providing it with a projection 42 at the inside which will engage and close the motor controlling switch 43 only when the cover is fully lowered, as in Figs. 1, 2 and 6.

The connections from this control switch 43 to the motor are not illustrated, but it will be appreciated that usual switch-to-motor electrical connections may be provided, the point being that the motor will not operate until the cover is lowered down into protective position over the same.

The safety cover may be mounted on the same pivotal supports which carry the motor and cutter base 21.

Fig. 3 shows how the combined pivotal mounts may be provided by bolts 44 extended inward through the end walls 41 of the cover 39 and through the uprights 23 of the frame into the base plate 21, with spacer sleeves 45 surrounding the outer portions of these bolts, seated in countersunk portions 46 of the bolt openings in the base and providing pivotal bearings engaged with the frame uprights 23 and engaged by the end walls of the cover.

This construction, it will be clear, enables the cutter mechanism, cover and guide chute all to be tilted as a unit into various positions of inclination to suit the normal stock line, as particularly shown in Fig. 6, or the cover to be independently shifted, as shown in Fig. 7. In the latter illustration, the lifting of the cover will interrupt the motor circuit to stop the operation of the cutter mechanism. Accordingly, it is possible to interrupt operation of the machine at any time by simply raising the cover to lift the motor starting projection 42 off the control switch 43.

The entire stock receiving and cutting mechanism is completely self-contained, consists of but relatively few, rugged parts, requires no servicing other than removal of the cut scrap, and is adaptable to all usual stock scrapping requirements.

What is claimed is:

A scrap chopper comprising a portable floor stand providing a base for locating the chopper at the stock scrap discharging side of a punch press or other machine operating on strip stock, a base plate pivoted on a horizontal axis at the side of the stand toward the machine, a motor driven scrap cutter mounted on said base plate adjoining the center of pivotal support, said base plate being freely adjustable about said center to locate said scrap cutter in different angular relations in respect to scrap issuing from the machine, means for securing said base plate in selected positions of angular adjustment, a protective cover over said scrap cutter hinged on an axis approximating the pivotal axis of the base plate for adjustment in the same angular relation as the pivotally supported base plate, a scrap guide on the cover over said cutter, said cover being angularly adjustable about its hinge independently of the pivotal mounting of the base plate whereby to shift the scrap guide into different angular relations independently of the angular adjustment of the base plate and switch means for controlling the motor driven cutter and positioned to be actuated by said cover in the lowering movement of the same over the base plate.

FREDERICK KOCH.

References Cited in the file of this patent

UNITED STATES PATENTS

| Number | Name | Date |
| --- | --- | --- |
| 217,725 | Bliss | July 22, 1879 |
| 354,164 | Meriman | Dec. 14, 1886 |
| 1,179,321 | Willerdorf | Sept. 5, 1916 |
| 1,414,727 | Edmands | May 2, 1922 |
| 2,171,769 | Stolar et al. | Sept. 5, 1939 |
| 2,475,747 | Letoile | July 12, 1949 |